United States Patent
Zhou et al.

(10) Patent No.: US 6,740,254 B2
(45) Date of Patent: May 25, 2004

(54) GLYCERIN TRIESTER PLASTICIZER

(75) Inventors: Lei Zhou, Copley, OH (US); George Schaefer, Strongsville, OH (US)

(73) Assignee: Ferro Corporation, Cleveland, OH (US)

(*) Notice: Subject to any disclaimer, the term of this patent is extended or adjusted under 35 U.S.C. 154(b) by 45 days.

(21) Appl. No.: 10/314,917

(22) Filed: Dec. 9, 2002

(65) Prior Publication Data

US 2003/0120104 A1 Jun. 26, 2003

Related U.S. Application Data

(63) Continuation-in-part of application No. 10/027,810, filed on Dec. 20, 2001.

(51) Int. Cl.$^7$ .......................... C09K 3/00; C07C 69/00; C07C 69/76
(52) U.S. Cl. ................... 252/182.24; 252/182.13; 560/8; 560/55; 560/124; 560/174; 560/189
(58) Field of Search ............... 252/182.11, 182.12, 252/182.13, 182.24; 560/8, 55, 129, 174, 189

(56) References Cited

U.S. PATENT DOCUMENTS

| | | | | |
|---|---|---|---|---|
| 3,970,569 A | * | 7/1976 | Sturwold et al. | 252/49.3 |
| 4,260,643 A | * | 4/1981 | Cochran | 426/606 |
| 4,297,292 A | * | 10/1981 | Logan et al. | |
| 4,366,100 A | * | 12/1982 | Naskar et al. | |
| 5,149,642 A | * | 9/1992 | Mazur et al. | 435/135 |
| 5,431,948 A | * | 7/1995 | Cain et al. | 426/607 |
| 5,445,822 A | * | 8/1995 | Bracco | 424/401 |
| 5,662,953 A | * | 9/1997 | Wheeler et al. | 426/2 |
| 5,670,540 A | * | 9/1997 | Horrobin et al. | 514/549 |
| 5,681,939 A | * | 10/1997 | Ferenz | 536/18.6 |
| 6,290,723 B1 | * | 9/2001 | Andrews et al. | 623/7 |

OTHER PUBLICATIONS

Sci–Finder Abstract, Report No. 1, dated Jul. 12, 2001.
Sci–Finder Abstract, Report No. 2, dated Jul. 12, 2001.
Sci–Finder Abstract, Report No. 3, dated Jul. 12, 2001.

* cited by examiner

*Primary Examiner*—Joseph D. Anthony
(74) *Attorney, Agent, or Firm*—Rankin, Hill, Porter & Clark LLP

(57) ABSTRACT

The present invention provides a phthalate-free plasticizer for polymer resins. The phthalate-free plasticizer according to the invention includes a mixture of different triesters of glycerin, at least one of which meets the formula:

$$CH_2(OOR_1)CH(OOR_2)CH_2(OOR_3)$$

wherein at least two of $R_1$, $R_2$, and $R_3$ are different alkyl or aryl groups. Phthalate-free plasticizers according to the invention can be made by esterifying glycerin with a mixture of acids in the presence of a catalyst. In the presently most preferred embodiment of the invention, the mixture of acids includes benzoic acid and butanoic acid. The plasticizer according to the invention can be used to modify the properties of a wide variety of polymers including vinyl polymers, rubbers, polyurethanes, and acrylics, and has superb thermostability and low volatility.

8 Claims, No Drawings

GLYCERIN TRIESTER PLASTICIZER

CROSS-REFERENCE TO RELATED APPLICATION

This application is a continuation-in-part of application Ser. No. 10/027,810 filed Dec. 20, 2001, now allowed.

BACKGROUND OF THE INVENTION

1. Field of Invention

The present invention provides a plasticizer for polymer resins, and more particularly, a phthalate-free plasticizer for polymer resins comprising a mixture of different triesters of glycerin, and a method of making the same.

2. Description of Related Art

Plasticizers are compounds or mixtures of compounds that are added to polymer resins to impart softness and flexibility. Phthalic acid diesters, which are also called phthalates, are the primary plasticizers for most flexible polymer products, especially polymer products formed from polyvinyl chloride (PVC) and other vinyl polymers. Examples of common phthalate plasticizers include, for example, di-isononyl phthalate (DINP), diallyl phthalate (DAP), and di-2-ethylhexyl-phthalate (DEHP).

Although phthalate plasticizers have been tested for more than 40 years and are among the most studied and best understood compounds in the world from a health and environmental perspective, phthalate plasticizers have recently come under intense scrutiny by public interest groups that are concerned about the potential of adverse health effects in children exposed to these chemicals. Consequently, there is a demand for phthalate-free plasticizers that provide the same properties when added to polymer resins such as, for example, vinyl polymers, rubbers, polyurethanes, and acrylics.

BRIEF SUMMARY OF THE INVENTION

The present invention provides a phthalate-free plasticizer for polymer resins and a method of making the same. A phthalate-free plasticizer according to the present invention comprises a mixture of different triesters of glycerin, at least one of which meets the formula:

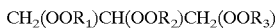

wherein at least two of $R_1$, $R_2$, and $R_3$ are different alkyl or aryl groups. In a preferred embodiment, $R_1$, $R_2$, and $R_3$ each contain up to about 11 carbon atoms, and more preferably from about 2 to about 11 carbon atoms each.

The phthalate-free plasticizer according to the present invention is very compatible with a wide variety of polymers including vinyl polymers, rubbers, polyurethanes, and acrylics. In addition, the phthalate-free plasticizer according to the invention has superb thermostability and low volatility.

The phthalate-free plasticizer according to the invention can be made by heating glycerin and a mixture of at least two different acids in the presence of a catalyst to form a mixture of different triesters of glycerin, at least one of which meets the formula:

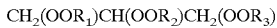

wherein at least two of $R_1$, $R_2$, and $R_3$ are different alkyl or aryl groups. In a preferred embodiment, the glycerin and mixture of acids are heated while under a partial vacuum to assist in the removal of water.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides a phthalate-free plasticizer for polymer resins. As used in the instant specification in the appended claims, the term "phthalate-free" means that the plasticizer does not contain any phthalate diesters, which are also known in the art simply as phthalates.

A phthalate-free plasticizer according to the invention comprises a mixture of different triesters of glycerin, at least one of which meets the formula:

wherein at least two of $R_1$, $R_2$, and $R_3$ are different alkyl or aryl groups. In other words, $R_1$ and $R_2$ can be the same but $R_3$ must be different, or $R_1$ and $R_3$ can be the same but $R_2$ must be different, or $R_2$ and $R_3$ can be the same but $R_1$ must be different. Preferably, $R_1$, $R_2$, and $R_3$ each contain up to about 11 carbon atoms, and more preferably from about 2 to about 9 carbon atoms each.

A phthalate-free plasticizer according to the invention can be formed by the process of esterifying glycerin with a mixture comprising at least two different acids to form a mixture of different triesters of glycerin. The acids comprising the mixture are preferably a mixture of alkyl acids and aryl acids.

The alkyl carboxylic acids used in the mixture can (but need not) be halogenated. Such acids can be linear, branched, or have cyclic moieties. Preferably, the alkyl carboxylic acids contain up to about 11 carbon atoms, or from about 2 to about 11 carbon atoms, or more preferably from about 4 to about 9 carbon atoms. Suitable alkyl acids include, for example, acetic acid, bromoacetic acid, propanoic acid, 2-chloropropanoic acid, 3-chloropropanoic acid, butanoic acid, 2-methylpropanoic acid, 2-ethylpropanoic acid, pentanoic acid, 2-methylbutanoic acid, 3-methylbutanoic acid, 2-ethylbutanoic acid, 2,2-dimethylbutanoic acid, 2,3-dimethylbutanoic acid, 3,3-dimethylbutanoic acid, 2-methylpentanoic acid, 3-methylpentanoic acid, 4-methylpentanoic acid, hexanoic, cyclopentyl acetic acid, cyclopentyl propanoic acid, cyclopentyl hexanoic acid, cyclohexane carboxylic acid, cyclohexane acetic acid, 2-ethylhexanoic acid, nonadecafluorodecanoic acid, decanoic acid, and undecanoic acid.

The aryl carboxylic acids used in the mixture have one are more aromatic rings. Such acids can (but need not) be substituted, with one or more aromatic hydrogens being replaced by alkyl, halogen, ether, and/or ketone substituent groups. Suitable aryl acids include, for example, benzoic acid, 2-methylbenzoic acid, 3-methylbenzoic acid, 4-methylbenzoic acid, 2-ethylbenzoic acid, 3-ethylbenzoic acid, 4-ethylbenzoic acid, 4-isopropylbenzoic acid, 4-tertiary butylbenzoic acid, 4-(1-methylpropyl)benzoic acid, 2-ethoxybenzoic acid, 3,4-dimethoxybenzoic acid, 4-methoxy-2-methylbenzoic acid, 4-acetylbenzoic acid, acetylmandelic acid, 2-chlorobenzoic acid, 3-chlorobenzoic acid, 4-chlorobenzoic acid, 2,3-dibromobenzoic acid, 2,4-di-iodobenzoic acid, 2,6-dibrombenzoic acid, 3,4-dibromobenzoic acid, 3,5-dichlorobenzoic acid, 2,3,5-tribromobenzoic acid, 2,4,6-trichlorobenzoic acid, 2,3,4,5,6-pentabromobenzoic acid, 1-naphthoic acid, 2-naphthoic acid, 4-biphenyl carboxylic acid, 2-biphenyl carboxylic acid, 4-biphenyl acetic acid, furfuryl carboxylic acid, and 3-pyridinecarboxylic acid.

In order to fully esterify one mole of gylcerin, three moles of acids are needed. In the preferred embodiment of the invention, for every mole of gylcerin that is esterified, a three mole mixture of different acids is used. Preferably, the three mole mixture of different acids comprises from about 0.5 to about 2.5 moles of an alkyl acid and from about 0.5 to about 2.5 moles of an aryl acid. It will be appreciated that in excess of three moles of different acids can be charged to the reactor for every mole of glycerin to be esterified, but only three moles of acids per mole of glycerin will actually participate in the reaction. A particularly preferable mixture of acids comprises 1.25 moles an alkyl acid (e.g., butanoic acid) and 1.75 moles of an aryl acid (e.g., benzoic acid) per mole of gylcerin esterified.

It will be appreciated that when the mixture of acids comprises a blend of only two different acids (e.g., $R_1OOH$ and $R_2OOH$), as many as six different glycerin triesters may be present in the resulting product: (e.g., $CH_2(OOR_1)CH(OOR_1)CH_2(OOR_1)$; $CH_2(OOR_1)CH(OOR_1)CH_2(OOR_2)$; $CH_2(OOR_1)CH(OOR_2)CH_2(OOR_1)$; $CH_2(OOR_2)CH(OOR_2)CH_2(OOR_1)$; $CH_2(OOR_2)CH(OOR_1)CH_2(OOR_2)$; and $CH_2(OOR_2)CH(OOR_2)CH_2(OOR_2)$. And, when the mixture of acids comprises a blend of three different acids (e.g., $R_1OOH$, $R_2OOH$, and $R_3OOH$), as many as eighteen different glycerin triesters may be present in the resulting product: (e.g., $CH_2(OOR_1)CH(OOR_1)CH_2(OOR_1)$; $CH_2(OOR_1)CH(OOR_1)CH_2(OOR_2)$; $CH_2(OOR_1)CH(OOR_2)CH_2(OOR_1)$; $CH_2(OOR_2)CH(OOR_2)CH_2(OOR_1)$; $CH_2(OOR_2)CH(OOR_1)CH_2(OOR_2)$; $CH_2(OOR_2)CH(OOR_2)CH_2(OOR_2)$; $CH_2(OOR_1)CH(OOR_1)CH_2(OOR_3)$; $CH_2(OOR_1)CH(OOR_3)CH_2(OOR_1)$; $CH_2(OOR_3)CH(OOR_3)CH_2(OOR_1)$; $CH_2(OOR_3)CH(OOR_1)CH_2(OOR_3)$; $CH_2(OOR_3)CH(OOR_3)CH_2(OOR_3)$; $CH_2(OOR_2)CH(OOR_2)CH_2(OOR_3)$; $CH_2(OOR_2)CH(OOR_3)CH_2(OOR_2)$; $CH_2(OOR_3)CH(OOR_3)CH_2(OOR_2)$; $CH_2(OOR_3)CH(OOR_2)CH_2(OOR_3)$; $CH_2(OOR_1)CH(OOR_2)CH_2(OOR_3)$; and $CH_2(OOR_2)CH(OOR_1)CH_2(OOR_3)$. Including a greater the number of different acids in the mixture of acids substantially increases the number of different triesters of glycerin present in the resulting product.

In order to obtain a plasticizer that is compatible with polymer resins, it is critical that the plasticizer comprise a mixture of different triesters of glycerin, with at least one of such triesters of glycerin meeting the formula:

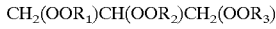
$$CH_2(OOR_1)CH(OOR_2)CH_2(OOR_3)$$

wherein at least two of $R_1$, $R_2$, and $R_3$ are different alkyl or aryl groups. Throughout the specification and in the appended claims, a plasticizer is considered to be compatible if it obtains an average grading of less than 1 in five trials conducted in accordance with the ASTM D 3291-97 standard.

For example, glyceryl tribenzoate (CAS No: 614-33-5) and glyceryl tributyrate (CAS No: 60-01-5) are commercially available triesters of glycerin that have been used as ink additives, in cosmetic formulations, and in the detergent industry. Glyceryl tribenzoate is not used as a primary plasticizer in vinyl polymers such as PVC because it is known to be relatively incompatible and/or inefficient. Glyceryl tributyrate has been used as a plasticizer in a biodegradable lactic-acid based polymer (see, e.g., Grandjean, U.S. Pat. No. 5,296,229), but it has not been used as a primary plasticizer in other resins, most probably due to its high volatility. Surprisingly, however, when these two commercially available triesters of glycerin are included as part of a mixture of different triesters of glycerin meeting the formula $CH_2(OOR_1)CH(OOR_2)CH_2(OOR_3)$, wherein at least two of $R_1$, $R_2$, and $R_3$ are different alkyl or aryl groups (i.e., the mixture includes glyceryl tribenzoate, glyceryl tributyrate, and glyceryl [1,2] bisbutanoate benzoate, glyceryl [1,3] bisbutanoate benzoate, glyceryl [1,2] bisbenzoate butanoate, and glyceryl [1,3] bisbenzoate butanoate), the mixture of different triesters of glycerin is very compatible with vinyl polymers including PVC, and provides other desirable properties required of a plasticizer, such as good thermostability, fast rate of fusion, low volatility, and low viscosity.

Phthalate-free plasticizers according to the present invention are preferably formed by heating glycerin and the mixture of different acids under a partial vacuum in the presence of a catalyst to form the mixture of different triesters. Suitable catalysts include, for example, acid catalysts such as benzene sulfonic acid and toluene sulfonic acid, metal oxide catalysts such as zinc oxide and titanium oxide, and zirconium-based catalysts such as zirconium acetate and zirconium oxide. Zirconium acetate is the presently most preferred catalyst for use in the invention. A small excess amount of acid provides reflux for continuous water removal. At the end of the reaction, excess acids can be vacuum stripped from the resulting crude mixture of gylcerin triesters, and the crude mixture of glycerin triesters can be further refined to remove color producing species, excess acid, and catalyst.

The relative amount of each of the species of different triesters of glycerin in the resulting product (i.e., product distribution) is dependent upon factors including temperature, reaction time, initial concentration of starting materials, and steric hindrance of starting materials. In the presently most preferred embodiment of the invention, a plasticizer comprises from about 5% to about 20% by weight glyceryl tribenzoate, from about 5% to about 20% by weight glyceryl [1,2] bisbutanoate benzoate, from about 15% to about 40% by weight glyceryl [1,3] bisbutanoate benzoate, from about 15% to about 40% by weight glyceryl [1,2] bisbenzoate butanoate, from about 5% to about 25% by weight glyceryl [1,3] bisbenzoate butanoate, and from about 5% to about 20% by weight glyceryl tributanoate.

Phthalate-free plasticizers according to the present invention can be used in a wide variety of polymer resins. For example, the plasticizers according to the invention can be used in vinyl polymers such as, for example, PVC, polyvinyl acetate, and polyvinyl butryal. They can also be used in rubbers such as, for example, nitrile and styrene-butadiene rubber (SBR), polyurethanes, and in thermoplastics such as acrylics. Other applications include polysulfides and cellulose.

The following examples are intended only to illustrate the invention and should not be construed as imposing limitations upon the claims.

EXAMPLE 1

A four-neck pot was fitted with an agitator, a thermocouple, a Dean-Stark trap, and a nitrogen bleed. 1 mole of glycerin, 1.255 moles of butanoic acid, 1.755 moles of benzoic acid (solid), and 1000 ppm zirconium acetate (catalyst) were charged into the pot. The pot was then heated to reflux (about 200° C.), and water was removed from the pot via the Dean-Stark trap. The pot temperature was gradually increased to about 220–225° C. over the course of about 2 hours. When the reaction was about two-thirds complete (about 2.5 hours), a vacuum was applied to maintain a good reflux. Near the end of the reaction (about 6 hours), the vacuum was pulled to less than about 10 torr to strip off excess butanoic acid and benzoic acid for recycle. The total reaction time was about 6 hours.

After the reaction was completed, the pot was cooled to about 100° C. 1.5 ml of 30% hydrogen peroxide was carefully added to the pot together with a quantity of 50% (wt/wt) NaOH solution sufficient to raise the pH of the mixture above about 13.0, and the temperature of the pot was maintained at about 100° C. for 10 minutes to decolorize the product and to remove the zirconium acetate catalyst. The product was washed three times with water at about 80–85° C., and then the product was dehydrated and filtered. Chemical analysis of the final product is shown in Table 1 below:

TABLE 1

| Component | Wt. % |
| --- | --- |
| glyceryl tributanoate $CH_2(OOC_4H_7)CH(OOC_4H_7)CH_2(OOC_4H_7)$ | 3.60 |
| glyceryl [1,2] bisbutanoate benzoate $CH_2(OOC_4H_7)CH(OOC_4H_7)CH_2(OOC_7H_5)$ | 7.75 |
| glyceryl [1,3] bisbutanoate benzoate $CH_2(OOC_4H_7)CH(OOC_7H_5)CH_2(OOC_4H_7)$ | 20.23 |
| glyceryl [1,2] bisbenzoate butanoate $CH_2(OOC_7H_5)CH(OOC_7H_5)CH_2(OOC_4H_7)$ | 25.95 |
| glyceryl [1,3] bisbenzoate butanoate $CH_2(OOC_7H_5)CH(OOC_4H_7)CH_2(OOC_7H_5)$ | 23.72 |
| glyceryl tribenzoate $CH_2(OOC_7H_5)CH(OOC_7H_5)CH_2(OOC_7H_5)$ | 18.75 |

20 grams of the final product was mixed with 30 grams of PVC resin and the mixture was milled to give a sheet for plasticizer compatibility testing in accordance with the procedures set forth in the ASTM D-3291-97 standard. A total of five test specimens of the plasticized PVC sheet were tested, and the average grade was less than 1.0.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A phthalate-free plasticizer for polymer resins comprising a mixture of different triesters of glycerin, wherein said mixture of different triesters of glycerin comprises at least two selected from the group consisting of glyceryl [1,2] bisbutanoate benzoate, glyceryl [1,3] bisbutanoate benzoate, glyceryl [1,2] bisbenzoate butanoate, and glyceryl [1,3] bisbenzoate butanoate.

2. The phthalate-free plasticizer according to claim 1 comprising:
   from about 5% to about 30% by weight of glyceryl tribenzoate;
   from about 10% to about 50% by weight of glyceryl [1,2] bisbutanoate benzoate and/or glyceryl [1,3] bisbutanoate benzoate;
   from about 10% to about 50% by weight glyceryl [1,2] bisbenzoate butanoate and/or glyceryl [1,3] bisbenzoate butanoate; and
   from about 3% to about 15% by weight glyceryl tributanoate.

3. A phthalate-free plasticizer for polymer resins formed by the process of esterifying glycerin with a mixture comprising:

butanic acid;
at least one aryl carboxylic acid; and
optionally one or more acids selected from the group consisting of acetic acid, bromoacetic acid, propanoic acid, 2-chloropropanoic acid, 3-chloropropanoic acid 2-methylpropanoic acid, pentanoic acid, 2-ethylpropanoic acid, 2-methylbutanoic acid, 3-methylbutanoic acid, hexanoic acid, 2-ethylbutanoic acid, 2,2-dimethylbutanoic acid, 2,3-dimethylbutanoic acid, 3,3-dimethylbutanoic acid, 2-methylpentanoic acid, 3-methylpentanoic acid, 4-methylpentanoic acid, cyclopentyl acetic acid, cyclopentyl propanoic acid, cyclopentyl hexanoic acid, cyclohexane carboxylic acid, cyclohexane acetic acid, 2-ethylhexanoic acid, nonadecafluorodecanoic acid, decanoic acid, and undecanoic acid;
wherein the acids comprising the miture condense with the glycerin to form different triesters of glycerin, at least one of which meets the formula $CH_2(OOR_1)CH(OOR_2)CH_2(OOR_3)$, wherein at least one of $R_1$, $R_2$, and $R_3$ is a butanoic group and at least one of $R_1$, $R_2$, and $R_3$ is an aryl group.

4. The phthalate-free plasticizer according to claim 3 wherein at least one aryl carboxylic acid comprises benzoic acid and wherein at least one of the different triesters of glycerin meets the formula $CH_2(OOR_1)CH(OOR_2)CH_2(OOR_3)$, wherein at least one of $R_1$, $R_2$, and $R_3$ is a butanoic group and at least one of $R_1$, $R_2$, $R_3$ is a benzoic group.

5. The phthalate-free plasticizer according to claim 3 wherein said mixture of different triesters of glycerin comprises at least two selected from the group consisting of glyceryl [1,2] bisbutanoate benzoate, glyceryl [1,3] bisbutanoate benzoate, glyceryl [1,2] bisbenzoate butanoate, and glyceryl [1,3] bisbenzoate butanoate.

6. The phthalate-free plasticizer according to claim 5 comprising:
   from about 5% to about 30% by weight of glyceryl tribenzoate;
   from about 10% to about 50% by weight of glyceryl [1,2] bisbutanoate benzoate and/or glyceryl [1,3] bisbutanoate benzoate;
   from about 10% to about 50% by weight glyceryl [1,2] bisbenzoate butanoate and/or glyceryl [1,3] bisbenzoate butanoate; and
   from about 3% to about 15% by weight glyceryl tributanoate.

7. The phthalate-free plasticizer according to claim 3 wherein at least one of the different triesters of glycerin meets the formula $CH_2(OOR_1)CH(OOR_2)CH_2(OOR_3)$, wherein one of $R_1$, $R_2$, $R_3$ is a butanoic group, one of $R_1$, $R_2$, $R_3$ is an aryl carboxylic group, and one of $R_1$, $R_2$, $R_3$ is an acetic, bromoacetic, propanoic, 2-chloropropanoic, 3-chloropropanoic, 2-methylpropanoic, pentanoic, 2-ethylpropanoic, 2-methylbutanoic, 3-methylbutanoic, hexanoic, 2-ethylbutanoic, 2,2-dimethylbutanoic, 2,3-dimethylbutanoic, 3,3-dimethylbutanoic, 2-methylpentanoic, 3-methylpentanoic, 4-methylpentanoic, cyclopentyl acetic, cyclopentyl propanoic, cyclopentyl hexanoic, cyclohexane carboxylic, cyclohexane acetic, 2-ethylhexanoic, nonadecafluorodecanoic, decanoic, or undecanoic group.

8. The phthalate-free plasticizer according to claim 7 wherein at least one of the different triesters of glycerin meets the formula $CH_2(OOR_1)CH(OOR_2)CH_2(OOR_3)$, wherein one of $R_1$, $R_2$, $R_3$ is a benzoic group, and one of $R_1$, $R_2$, $R_3$ is an acetic, bromoacetic, propanoic, 2-chloropropanoic, 3-chloropropanoic, 2-methylpropanoic, pentanoic, 2-ethylpropanoic, 2-methylbutanoic, 3-methylbutanoic, hexanoic, 2-ethylbutanoic, 2,2-dimethylbutanoic, 2,3dimethylbutanoic, 3,3-dimethylbutanoic, 2-methylpentanoic, 3-methylpentanoic, 4-methylpentanoic, cyclopentyl acetic, cyclopentyl propanoic, cyclopentyl hexanoic, cyclohexane carboxylic, cyclohexane acetic, 2-ethylhexanoic, nonadecafluorodecanoic, decanoic or undecanoic group.

* * * * *